United States Patent
Ostrom et al.

(10) Patent No.: US 11,027,996 B1
(45) Date of Patent: Jun. 8, 2021

(54) CROWN ETHER FUNCTIONALIZED SUBSTRATES

(71) Applicant: The United States of America, as Represented by the Secretary of the Navy, Arlington, VA (US)

(72) Inventors: Gregory Stephen Ostrom, China Lake, CA (US); Benjamin G Harvey, China Lake, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 218 days.

(21) Appl. No.: 16/255,322

(22) Filed: Jan. 23, 2019

(51) Int. Cl.
*H01M 4/02* (2006.01)
*C02F 1/68* (2006.01)
*C09C 1/24* (2006.01)
*C09C 3/08* (2006.01)
*C02F 1/48* (2006.01)
*B82Y 40/00* (2011.01)
*B82Y 30/00* (2011.01)

(52) U.S. Cl.
CPC ............... *C02F 1/683* (2013.01); *C09C 1/24* (2013.01); *C09C 3/08* (2013.01); *B82Y 30/00* (2013.01); *B82Y 40/00* (2013.01); *C01P 2002/72* (2013.01); *C01P 2002/82* (2013.01); *C01P 2002/88* (2013.01); *C01P 2004/64* (2013.01); *C01P 2006/42* (2013.01); *C02F 1/488* (2013.01); *C02F 2305/08* (2013.01)

(58) Field of Classification Search
CPC ........................................................ H01M 4/02
See application file for complete search history.

(56) References Cited

PUBLICATIONS

Hankins ("Immobilization of Crown Ether Carboxylic Acids on Silica Gel and Their Use in Column Concentration of Alkali Metal Cations from Dilute Aqueous Solutions"Anal. Chem. 1996, 68, 2811-2817, 1996).*

* cited by examiner

*Primary Examiner* — Jacob B Marks

(74) *Attorney, Agent, or Firm* — Naval Air Warfare Center Weapons Division; Matthew D. Pangallo; Stuart H. Nissim

(57) ABSTRACT

A method for making crown ether functionalized substrates, which includes modifying crown ether-based molecules by reacting with carboxylic acid functionalize chains. The crown ether-based molecules are then attached to substrates, thereby forming crown ether functionalized substrates.

13 Claims, 10 Drawing Sheets

CROWN ETHER FUNCTIONALIZED SUBSTRATES

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND

Aqueous purification or decontamination methods vary depending on the contaminants being removed from the aqueous solution. For example, purifying water from a river may include multiple steps where the water has to be chemically treated and filtered to produce drinkable water. In aqueous decontamination methods, aqueous waste may be produced at industrial facilities that requires the removal of specific contaminates generated by that particular industrial production method. As a result, specific purification or decontamination methods are required to remove unique contaminants.

BRIEF DESCRIPTION OF THE DRAWINGS

Features and advantages of examples of the present disclosure will be apparent by reference to the following detailed description and drawings, in which like reference numerals correspond to similar, though perhaps not identical, components. Reference numerals or features having a previously described function may or may not be described in connection with other drawings in which they appear.

DETAILED DESCRIPTION

Generally, aqueous purification or decontamination may be performed by using techniques including forward or reverse osmosis, electrodialysis, or electrodeionization. These methods use fine pore membranes that require high pressures. The membranes may malfunction or degrade over time, which may require frequent replacement of the membranes. Other methods of aqueous purification or decontamination, such as distillation, require a large amount of energy or may be non-selective to remove all contaminants, which may be inefficient depending on the contaminants being removed from an aqueous solution. Functionalized molecules, such as nanoparticles, have previously been prepared to selectively remove target analytes from different aqueous solutions. However, methods for producing these nanoparticles can be complex, multi-step processes.

In a method disclosed herein, a one-step procedure is described, which produces crown ether functionalized substrates. Crown ether functionalized substrates described herein can be prepared to target specific ionic contaminants in aqueous solutions. As a result, the method disclosed herein to produce the crown ether functionalized substrates is less complex and more efficient compared to other multistep methods used to produce functionalized substrates to remove target analytes. Furthermore, the crown ether functionalized substrates can be recycled by removing the ionic contaminants that are bonded to the molecules on the substrates once the media is separated from the molecules. As such, the reversible method for removing ionic contaminants described herein is a low cost, low energy method compared to conventional methods of purifying or decontaminating aqueous solutions.

In a first method disclosed herein, a method for making crown ether functionalized substrates is provided. The method includes modifying crown ether-based molecules, by reacting carboxylic acid functionalized hydrocarbon chains with crown ether-based molecules, to produce modified crown ether-based molecules. The modified crown ether-based molecules are then attached to substrates, thereby forming crown ether functionalized substrates.

Figure 1:
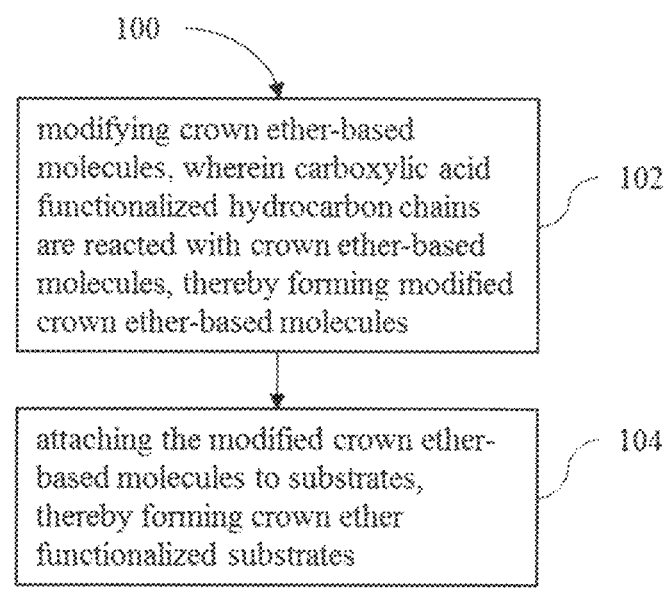
FIG. 1 is a flow diagram of an example of a method for making crown ether functionalized substrates herein.

Referring now to FIG. 1, step 102 of method 100 includes modifying crown ether-based molecules, where a carboxylic acid functionalized hydrocarbon chain is reacted with crown ether-based molecules thereby forming modified crown ether-based molecules. In step 102, the reaction forms bifunctional crown ether-based molecules with a pendent carboxylic acid group in a single step. The carboxylic acid group allows the molecule to attach to a substrate through reaction or interaction with surface hydroxyl groups or other functional groups on the substrate. This approach negates the need for protecting one of the carboxylic acid groups, which avoids multistep methods for producing the multifunctional crown ether molecules.

Any aromatic crown-ether based molecule may be used and modified in the reaction. Some examples of crown ether-based molecules include substituted and non-substituted crown ethers containing an aromatic ring system, benzocrown ethers, azocrown ethers, metallacrown ethers, thiocrown ethers, cryptands, and combinations thereof.

The carboxylic acid functionalized hydrocarbon chains may be any straight chain or branched chain that can generate a bifunctional crown ether with a pendent carboxylic acid group. Some examples of the acid chains include a diacid chain, a polyacid chain, an aromatic acid chain, aliphatic acid chain, and combinations thereof. One specific example includes any $\alpha,\omega$-dicarboxylic acid chain with about 4 to about 20 carbons.

In another example, the dicarboxylic acid functionalized hydrocarbon chain is a bifunctional molecule that includes two terminal carboxylic acid groups. In another example, the two carboxylic acid groups are located anywhere on the acid chain. The carbon atoms in the dicarboxylic acid functionalized hydrocarbon chain may range from about 4 carbon atoms to about 100 carbon atoms. The crown ether-based molecules and dicarboxylic acid functionalized hydrocarbon chain may be present as a solution in a ratio of crown-ether based molecules to the dicarboxylic acid functionalized hydrocarbon chain ranging from about 1:1 to about 1:10, respectively.

In step 102, in another example, the reaction between the dicarboxylic acid functionalized hydrocarbon chain and the crown either-based molecules occurs in the presence of an acid catalyst. Some examples of the acid catalyst include 7.7 wt% $P_2O_5$ in methanesulfonic acid (Eaton's Reagent), phosphoric acid, sulfuric acid, p-toluenesulfonic acid, heterogeneous acid catalysts (e.g., AMBERLYST®-15, NAFION®-H), heterogeneous Lewis acid catalysts, homogeneous Lewis acid catalysts, heterogeneous Brønsted acids, homogeneous Brønsted acids, and combinations thereof. The reaction in the presence of an acid catalyst may occur for a time ranging from about 1 hour to about 48 hours. The temperature during the reaction may range from about 20° C. to about 100° C.

Figure 2:
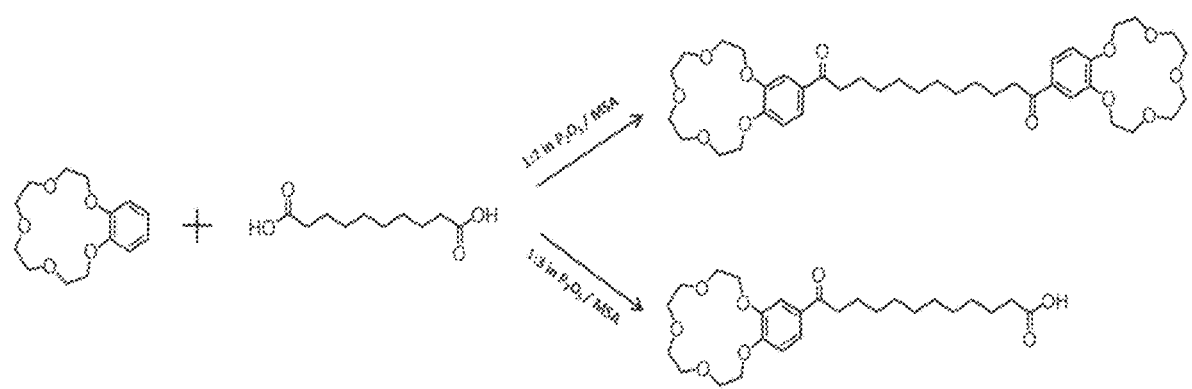
FIG. 2 is an example of a one-pot synthesis of crown ether functionalized molecules.

FIG. 2 shows two examples of a crown acid synthesis. In one example, an $\alpha, \omega$-dicarboxylic acid chain is reacted with benzocrown ether in a 1:1 ratio in the presence of Eaton's Reagent to produce bis-crown. In an example, the $\alpha, \omega$-dicarboxylic acid chain is reacted with benzocrown ether in a 1:3 ratio in the presence of Eaton's Reagent to produce crown acid.

Referring now to FIG. 1, the next step 104 of method 100 includes attaching the modified crown ether-based molecules to substrates, thereby forming crown ether functionalized substrates. Attaching the crown ether-based molecules to a substrate may occur in-situ or through post-functionalization. Some examples of substrates include solid or porous particles (e.g., nanoparticles or micron sized particles), a solid or porous support, a solid or porous surface, and combinations thereof.

Figure 3:
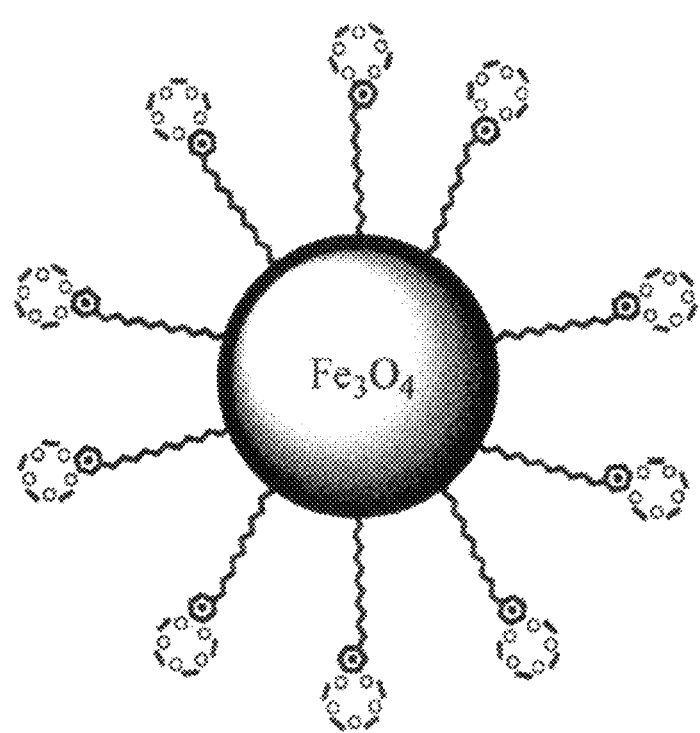
FIG. 3 is an example of a magnetite nanoparticle functionalized with crown ether ligands.

In one example, the substrate is solid or porous particles are nanoparticles having a diameter ranging from about 1 nm to about 100 nm. In another example, the particles have a diameter ranging from about 100 nm to about 1 micron. In a further example, the particles have a diameter ranging from about 1 micron to 500 microns. Some examples of particles that may be used herein include magnetic nanoparticles, superparamagnetic nanoparticles, and combinations thereof. The particles can be metallic nanoparticles, metal oxide nanoparticles, and mixed metal oxide particles. Some examples of metallic particles include metals such as Fe, Co, Ni, Mn, lanthanides, and combinations thereof. A specific example of the magnetic particles is iron oxide nanoparticles, such as $Fe_3O_4$. FIG. 3 shows an example of a crown ether functionalized magnetite ($Fe_3O_4$) nanoparticle. Any superparamagnetic nanoparticle, such as magnetite, may be used.

In another example, solid or porous supports may be used as the substrate. The solid or porous supports may be any solid or porous support that has surface groups that can react with the carboxylic acid group of the modified crown ether-based molecules or participate in another interaction (e.g. hydrogen bonding). Some examples of materials that make up the solid or porous supports include metals, metal oxides, metalloid oxides, ceramics, polymers, and combinations thereof.

In another example, the substrate is a solid or porous surface. The surface may be any solid or porous surface that has surface groups that can react with the carboxylic acid group of the modified crown ether-based molecules or participate in another interaction (e.g. hydrogen bonding). Some examples of solid or porous surfaces include metals, metal oxides, metalloid oxides, ceramics, polymers, and combinations thereof.

The crown ether-based molecule may be attached to the substrate through heating, mixing, sonication, refluxing, altering the pH of a solution that contains both the substrate and the crown ether ligand, and combinations thereof. In one example, the crown ether-based molecule may be attached to a particle during the particle formation (i.e., in-situ). For example, superparamagnetic nanoparticles may be prepared in solutions that also contain crown ether ligands. The solution may be mixed via sparging, and functionalized nanoparticles may be recovered by centrifugation, and drying.

In another method herein, a method for removing ionic contaminants is provided. The method includes mixing crown ether functionalized substrates with media containing ionic contaminants, thereby binding the ionic contaminants to the crown ether functionalized substrates, separating the crown ether functionalized substrates from the media, and regenerating the crown ether functionalized substrates.

Figure 4:
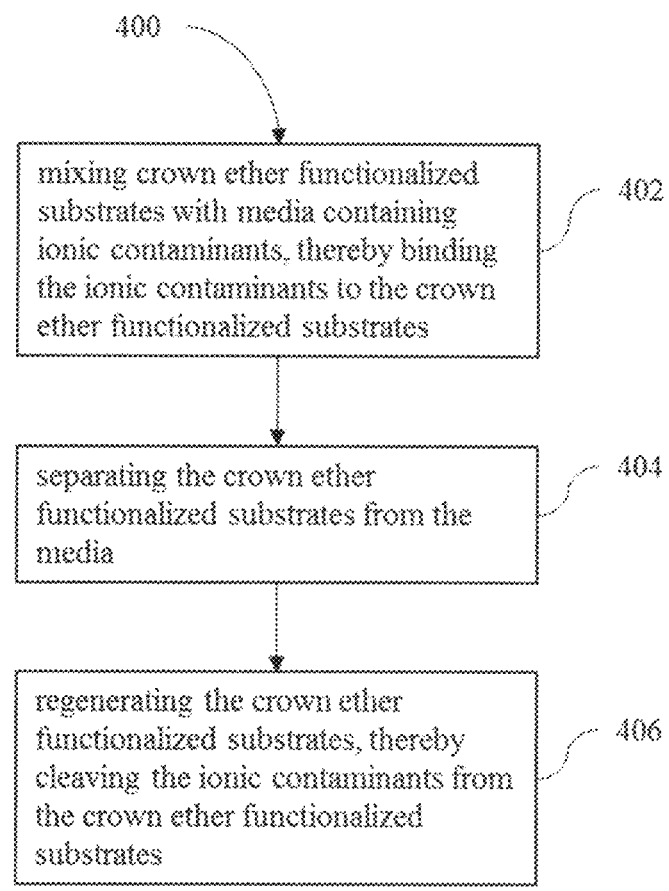
FIG. 4 is a flow diagram of an example of a method for removing ionic contaminants herein.

Referring now to FIG. 4, step 402 of method 400 includes mixing crown ether functionalized substrates with media containing ionic contaminants, thereby binding the ionic contaminants to the crown ether functionalized substrates. In one example, mixing may include adding the contaminated media to the crown ether functionalized substrates to form a mixture (e.g., adding a solution of the contaminated media to a solid support functionalized with crown ether-based molecules). In another example, the crown ether functionalized substrates may be added to the contaminated media to form a mixture (e.g., adding crown ether functionalized particles to the contaminated media in a solution).

In one example, the media includes seawater, aqueous waste streams, tap water, municipal water supplies, brackish water, and recreational water sources (e.g., lakes and ponds). Some examples of the ionic contaminants may be sodium chloride from seawater, effluent waste from plating shops, painting shops, or cleaning operations, trace metals from any water source, heavy metal ions (e.g., lead, mercury, cadmium, etc.), and toxic metals (e.g., beryllium or chromium). In another example, the ionic contaminant could be a particular ion of interest, such as a rare element, that can be removed and later isolated.

In an example, the media may be mixed with the crown ether functionalized substrates using shaking, sparging, stirring, sonication, dynamic flow, or combinations thereof. In this method 400, the crown ether functionalized substrates may be any of the crown ether functionalized substrates previously described herein in method 100. In one example, the crown ether functionalized substrates are particles, such as magnetic particles, or superparamagnetic particles, that may be added to a solution containing the media with a contaminant.

Referring now to FIG. 4, the step 404 of method 400 includes separating the crown ether functionalized substrates from the media. Any method of separation may be used to separate crown ether functionalized substrates, that are bonded to ionic contaminants, from the media. In one example, when the crown ether functionalized substrates are magnetic or superparamagnetic particles with crown ether-based molecules bonded thereto, the particles may be separated from the media by applying a magnetic field. In another example, when the crown ether functionalized substrates are a solid support or surface in a mixing chamber, separation may occur by removing the media from the mixing chamber. In yet another example, when the crown ether functionalized substrate is a solid support, separation may occur by filtering the media through the solid support.

Referring back to FIG. 4, step 406 of method 400 includes regenerating the crown ether functionalized substrates, thereby releasing the ionic contaminants from the crown ether functionalized substrates. Some examples of regenerating the crown ether functionalized substrates include chemical reduction or oxidation, electrochemical reduction or oxidation, exchange reactions, solvent washing, or combinations thereof. In an example, the chemical reduction or oxidation can be accomplished by using a reducing or oxidizing agent. In another example, solvent washing can occur when two different solvents with significantly different polarities are used to extract the contaminant ion from the crown ether functionalized substrates.

After the crown ether functionalized substrates have been regenerated, the molecules can be dispersed back into contaminated media, have contaminated media dispersed into a mixing chamber containing the regenerated crown ether functionalized substrates, or stored for later use.

To further illustrate the present disclosure, examples are given herein. It is to be understood that these examples are provided for illustrative purposes and are not to be construed as limiting the scope of the present disclosure.

EXAMPLES

In all of the examples described herein, the syntheses were performed at ambient temperature. Sample sonications were accomplished with a Branson 3510 ultrasonic water bath, Fine particle-liquid separations were facilitated using a Labnet/Hermle Z200A high capacity centrifuge.

Example 1: Synthesis of 12-oxo-12-(4'-benzo-15-crown-5-ether)-dodecanoic acid (Crown Acid)

First, Eaton's Reagent was prepared by adding $P_2O_5$ (24 g, 169 mmol) to methanesulfonic acid (200 mL) and stirring the mixture at room temperature until the solids were completely dissolved. Dodecanedioic acid (5.1 g, 22.1 mmol) was then added to the Eaton's Reagent and stirred until completely dissolved. A solution of benzo-15-crown-5-ether (2.0 g, 7.45 mmol) in Eaton's Reagent (50 mL) was then prepared and added drop-wise to the dodecanedioic solution over a period of 1.5 hours at ambient temperature and allowed to react with stirring for an additional 4.5 hours. The reaction mixture was then poured into 300 mL of chilled, deionized water to quench the reaction. The suspended solids were separated by filtration and rinsed thoroughly with fresh deionized water. The solid was then extracted with approximately 300 mL of $CHCl_3$ and filtered. The filtrate was placed in a separatory funnel and extracted with three, 200 mL aliquots of deionized water. The $CHCl_3$ was dried with $MgSO_4$ and then removed under reduced pressure to yield 3.25 g of crude product as a waxy yellow solid (90% yield).

The crown acid was purified by dissolving 200 mg of crude product in 20 mL of chloroform in a small beaker. An equivalent volume of heptane was added and the solution was heated to boiling until the volume was reduced by half. The remaining hot heptane solution was decanted into a clean beaker and chilled in an ice bath for approximately 10 minutes to 15 minutes to precipitate the product as a white solid. The solid product was collected by filtration and dried under reduced pressure (50% yield).

Figure 5A:
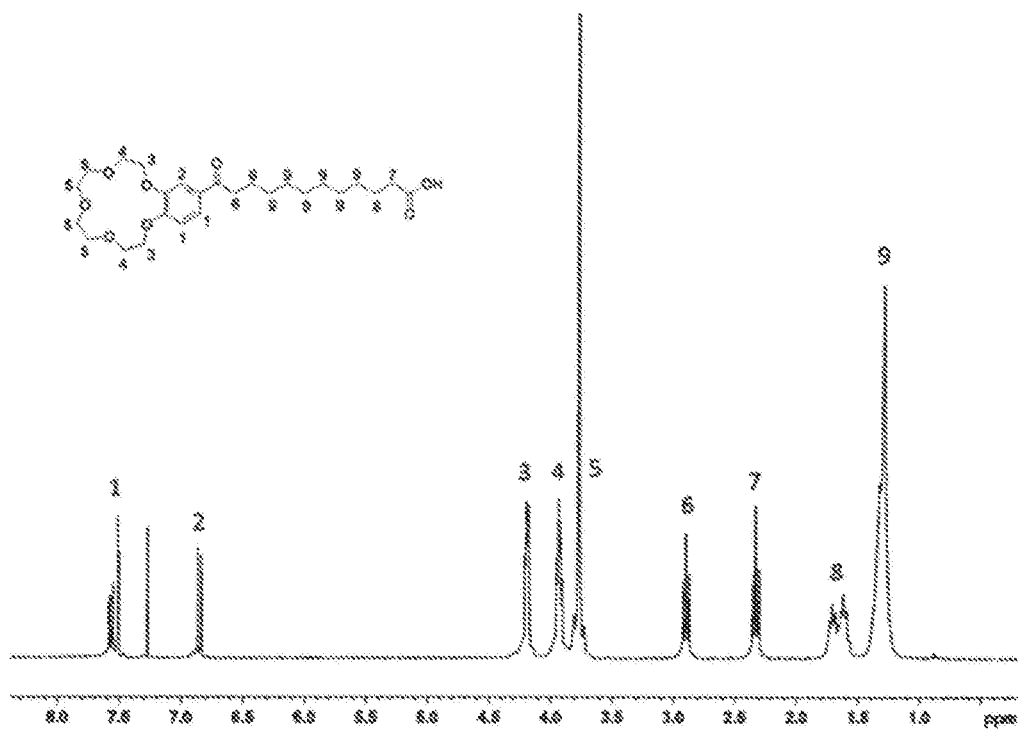
FIG. 5A-5B are $^1$H NMR and $^{13}$C NMR spectra of a crown acid with the chemical shifts in parts-per-million (ppm) obtained using the method described herein.
Figure 5B:
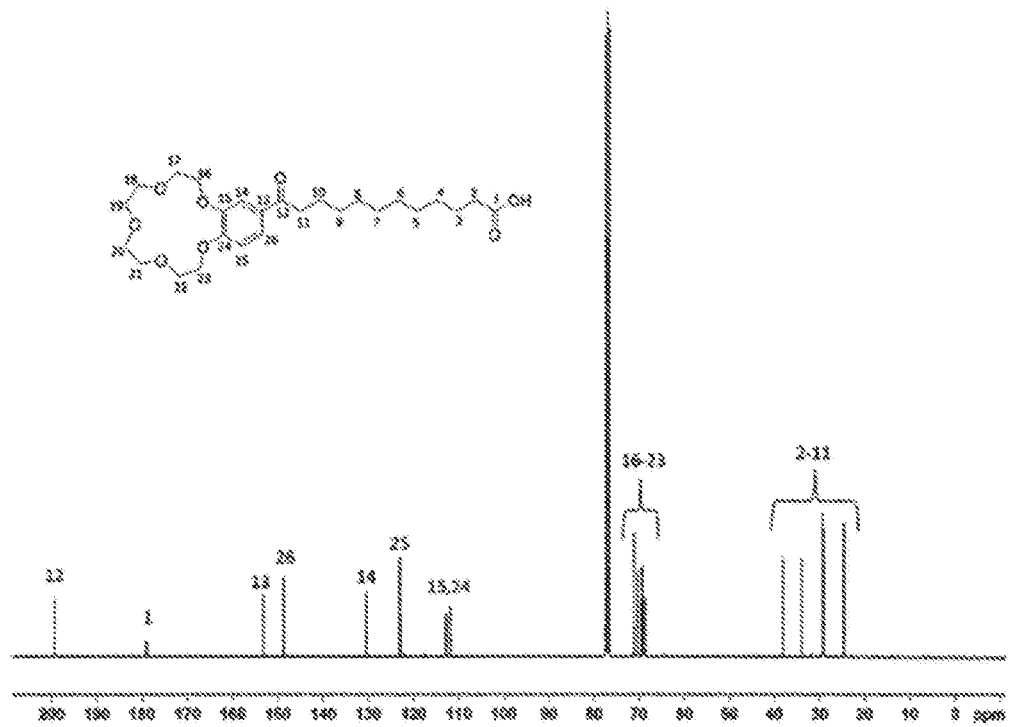

FIGS. 5A and 5B show $^1H$ NMR and $^{13}C$ NMR spectra for crown acid. $^1H$ and $^{13}C$ NMR spectra were collected on a Bruker AC 300 MHz spectrometer in $CDCl_3$ and spectra were referenced to the residual solvent peaks ($^1H$, δ 7.27; $^{13}C$, δ 77.16). FIG. 5A shows the $^1H$ NMR spectrum for the crown acid that was produced using the above method. The drawing insert assigns the protons to their corresponding NMR peak. Peaks 1 and 2 represent the three aromatic protons with an integration of 2:1, respectively. This result confirms single addition of the dodecanedioic acid to the aromatic ring. Multiplets observed between 3.5 ppm and 4.5 ppm represent the 16 protons in the crown ether moiety.

FIG. 5B shows the $^{13}C$ NMR spectrum results for the crown acid that was produced using the above method. The $^{13}C$ NMR reveals 26 peaks, which is also consistent with the structure of 12-oxo-12-(4'-benzo-15-crown-5-ether)-dodecanoic acid (i.e., crown acid). The peaks present at 199 ppm and 178 ppm are assigned as the carbonyl carbons of the ketone and carboxylic acid groups, respectively.

Example 2: Isolation of bis-1,12-[benzo-15-crown-5-ether]-2,11-dodecanedione (Bis-Crown)

For bis-crown, dodecanedioic acid (2.6 g, 11.3 mmol) was dissolved in Eaton's reagent (100 mL) and stirred until completely dissolved. Benzo-15-crown-5-ether (3.0 g, 11.2 mmol) was added to the dodecanedioic acid solution at ambient temperature and allowed to react with stirring for 6 hours. The reaction mixture was then poured into 100 mL of chilled, deionized water to quench the reaction and allowed to cool. The solution was extracted with three, 100 mL aliquots of $CH_2Cl_2$. The $CH_2Cl_2$ aliquots were combined and washed with two, 125 mL aliquots of deionized water and one 125 mL aliquot of brine. The $CH_2Cl_2$ fraction was dried with $MgSO_4$, filtered, and the solvent then removed under reduced pressure to yield 5.33 g of crude product as a waxy yellow solid (65% yield). The bis-crown was recrystallized from heptane, washed twice with hot methanol, and dried under reduced pressure.

Figure 6A:
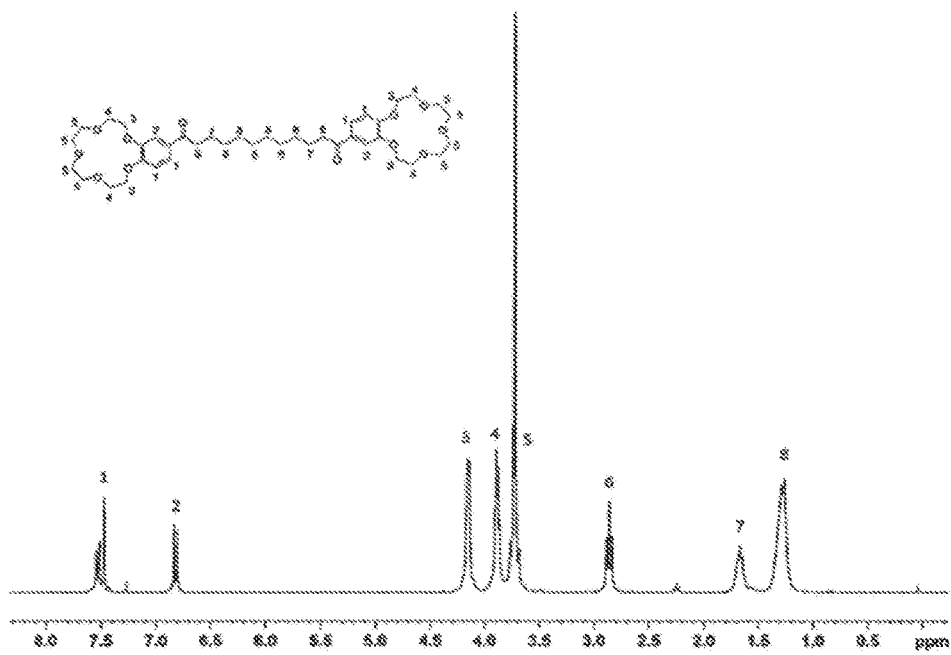
FIG. 6A-6B are $^1$H NMR and $^{13}$C NMR spectra of a bis-crown product with the chemical shifts in parts-per-million (ppm) obtained using the method herein.
Figure 6B:
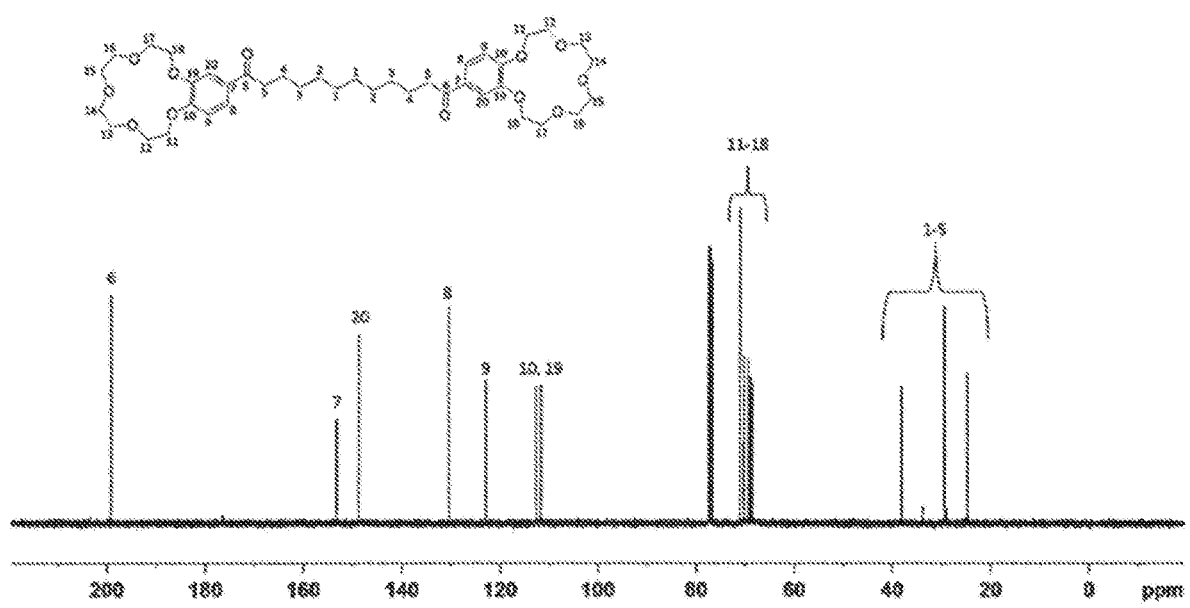

FIGS. 6A and 6B show $^1H$ NMR and $^{13}C$ NMR spectra for bis-crown. $^1H$ and $^{13}C$ NMR spectra were collected on a Bruker AC 300 MHz spectrometer in $CDCl_3$ and spectra were referenced to the residual solvent peaks ($^1H$, δ 7.27; $^{13}C$, δ 77.16). FIG. 6A shows the $^1H$ NMR spectrum for bis-crown using the method described above to make the bis-crown. The $^1H$ NMR spectra for both bis-crown and crown acid (FIG. 5A) display aromatic proton peaks with the same splitting pattern, matching peaks for crown ether ring protons, and similar peaks in the aliphatic region, with the exception of the triplet at 2.34 ppm. The protons represented by this triplet are analogous to those observed at 2.90 ppm in the bis-crown spectrum due to the symmetry in bis-crown.

FIG. 6B shows the $^{13}C$ NMR spectrum results for the bis-crown that was produced using the above method. The $^{13}C$ NMR spectrum showed the number of carbon peaks is reduced from 26 for the crown acid (FIG. 5B) to 20 for the bis-crown due to the symmetry of the molecule. Furthermore, the peak at 178 ppm representing the carboxylic acid carbon observed in the crown acid spectrum is not present in the bis-crown spectrum due to the formation of a second ketone.

Example 3: Synthesis and Functionalization of Magnetite Nanoparticles

There are two examples of synthesizing and functionalizing the magnetite particles herein. First, the magnetitie particles are synthesized and functionalized in separate steps. In this example, $FeCl_3.6H_2O$ (5 g, 18.5 mmol) and $FeCl_2.4H_2O$ (1.84 g, 9.25 mmol) were dissolved in deionized water (300 mL) and sparged with nitrogen for 2 hours.

A 12 mL aliquot of 14M $NH_4OH$ was added dropwise over 30 min to produce fine black particles of $Fe_3O_4$. The mixture was allowed to react for 2 hours using a stream of nitrogen gas to mix the solution. The reaction mixture was then divided among six 50 mL tubes, which were centrifuged at 5000 rpm for 15 minutes. After 15 minutes the supernatant liquid was decanted. 40 mL of water was added to each tube. The tubes were then shaken vigorously to break up the nanoparticle pellets, and the nanoparticles were isolated using centrifugation followed by decantation. This same process was repeated with acetone. The remaining solid was then dried under vacuum and collected. A quantitative yield of magnetite was obtained.

Next, magnetite nanoparticles (100 mg) were dispersed in 20 mL of acetone containing 20 mg of dissolved crown acid and sonicated for one hour. Afterwards, the nanoparticles were magnetically separated and the remaining liquid was decanted. A 20 mL aliquot of fresh acetone was added to the magnetite nanoparticles and sonicated for 20 minutes. The nanoparticles were magnetically separated from solution and dried under reduced pressure overnight to obtain functionalized magnetite nanoparticles.

In another example, the functionalized magnetite nanoparticles were formed in-situ in a single step. $FeCl_3.6H_2O$ (2.5 g, 9.25 mmol), and $FeCl_2.4H_2O$ (0.92 g, 4.63 mmol) were dissolved in deionized water (300 mL). Crown acid (100 mg) was added to the solution, which was then sparged with a stream of nitrogen gas for 2 hours. A 6 mL aliquot of 14 M $NH_4OH$ was added dropwise over 45 minutes, which produced fine black particles of $Fe_3O_4$. A stream of nitrogen gas was used to stir the mixture for an additional 2 hours. The reaction mixture was then divided among six 50 mL tubes, which were centrifuged at 5000 rpm for 20 minutes. After 20 minutes, the supernatant liquid was decanted. 40 mL of deionized water was then added to each tube. The mixtures were sonicated for 30 minutes, centrifuged at 5000 rpm for 20 minutes, and decanted. This process was repeated with acetone and the remaining solid was dried under reduced pressure and collected to obtain the in-situ functionalized magnetite nanoparticles.

Figure 7:
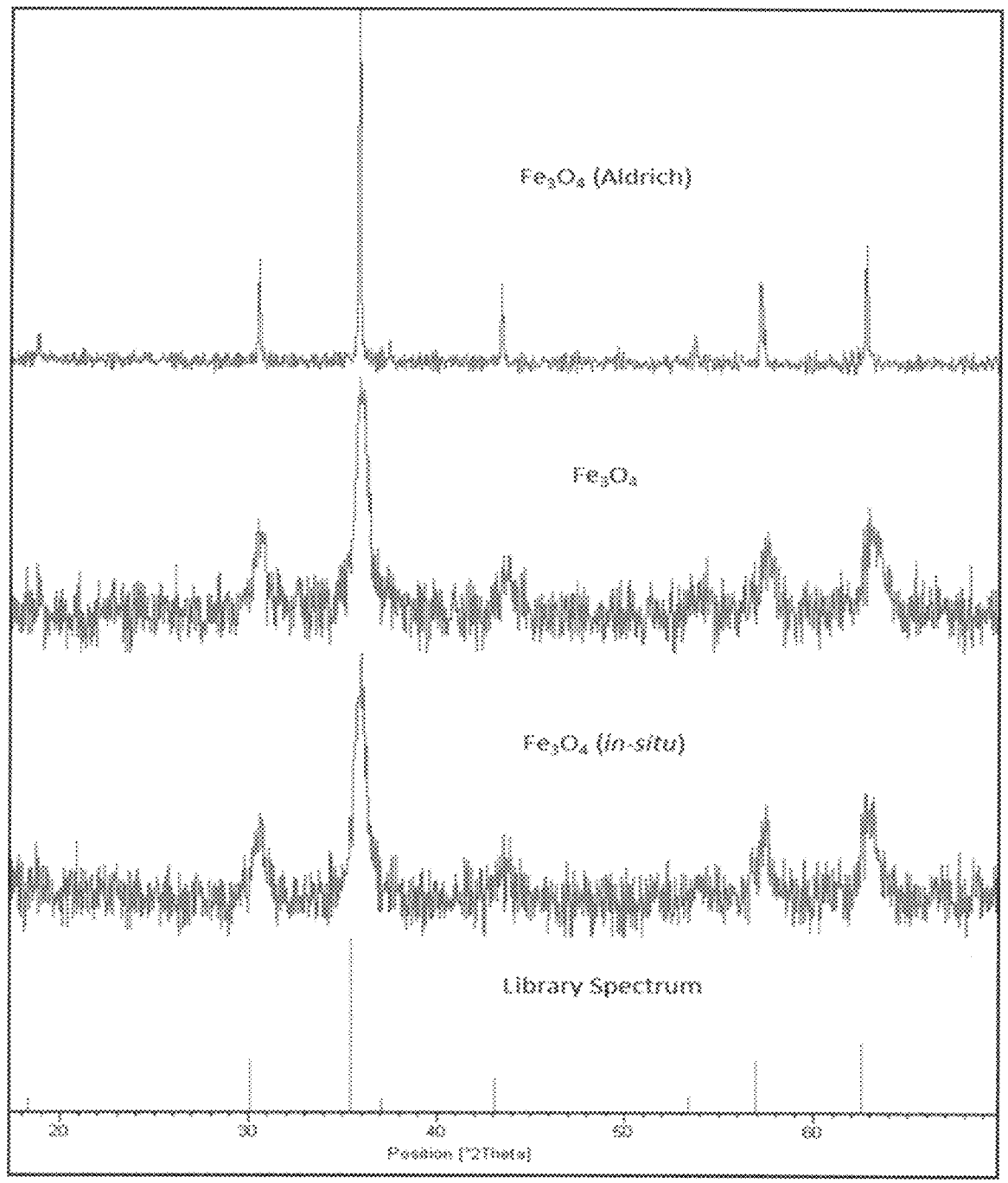
FIG. 7 depicts powder X-ray diffraction results of magnetite nanoparticles, an example of crown ether functionalized nanoparticles, and another example of in-situ functionalized crown ether nanoparticles.

FIG. 7 shows powder X-ray diffraction patterns from magnetite purchased from Sigma Aldrich, synthesized magnetite that had not been functionalized, and in-situ functionalized magnetite. The X-ray diffraction was performed to determine the average particle size. X-ray diffraction (XRD) patterns were collected on a Panalytical X'Pert Pro X-Ray Diffractometer equipped with Ni-filtered Cu Kα radiation ($\lambda$=1.5418 Å) and operated at 45 kV and 40 mA. The diffractograms were recorded in the range of 4 to 70° (2θ) at a rate of 1.2 degrees/min.

In FIG. 7, the library diffraction pattern consists of nine lines at 18.3°, 30.1°, 35.5°, 37.2°, 43.2°, 53.4°, 56.9°, 62.5°, and 65.7° (2θ). A comparison of the three sample patterns to that of the library spectrum reveals that these characteristic lines are present at the same relative intensity, confirming the identity of each sample as magnetite. The peaks observed in the diffractograms of both the synthesized magnetite and in situ functionalized magnetite exhibit a broadening that is indicative of a smaller particle size compared to that of the Sigma Aldrich reference sample (50 nm to 100 nm). The average particle size of these two samples was calculated as a function of the peak broadening using the Scherrer Method. The average particle size of the synthesized magnetite and the in situ functionalized magnetite was determined to be 20.4 nm and 24.0 nm, respectively.

Figure 8A:
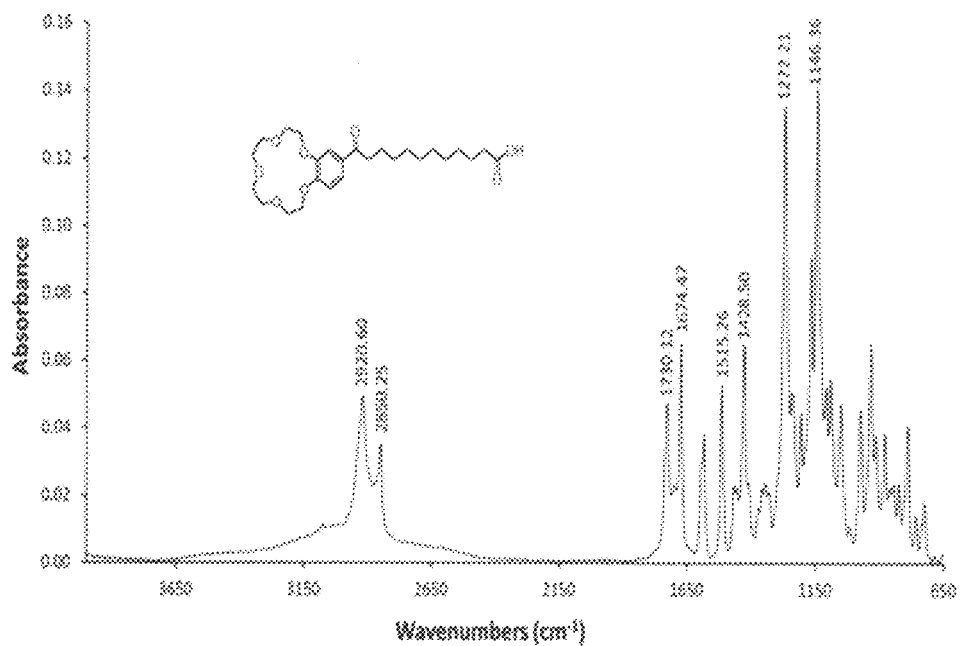
FIG. 8A-8B are Fourier-transform infrared spectroscopy (FTIR) results, with units of wavenumbers ($cm^{-1}$) (X-axis) vs. the absorbance (Y-axis) for bis-crown and crown acid obtained using the method herein.
Figure 8B:
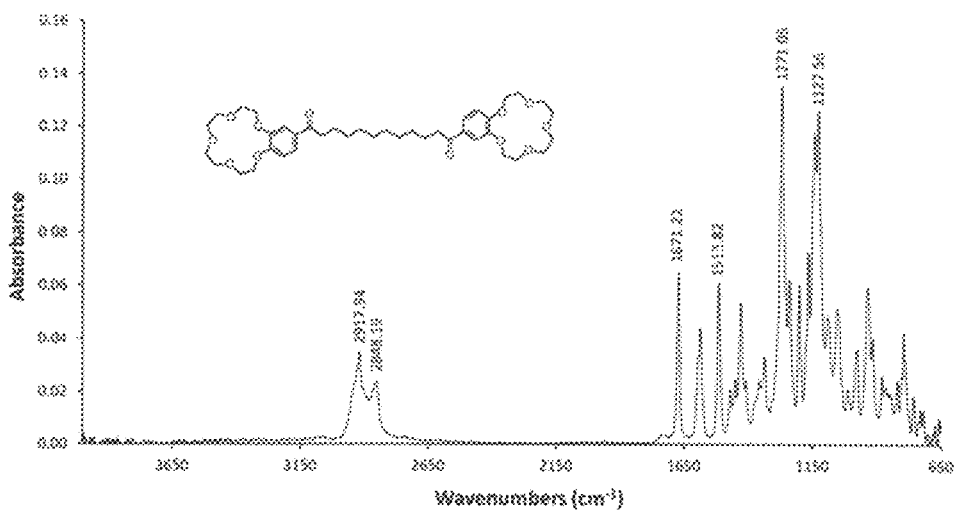
Figure 9:
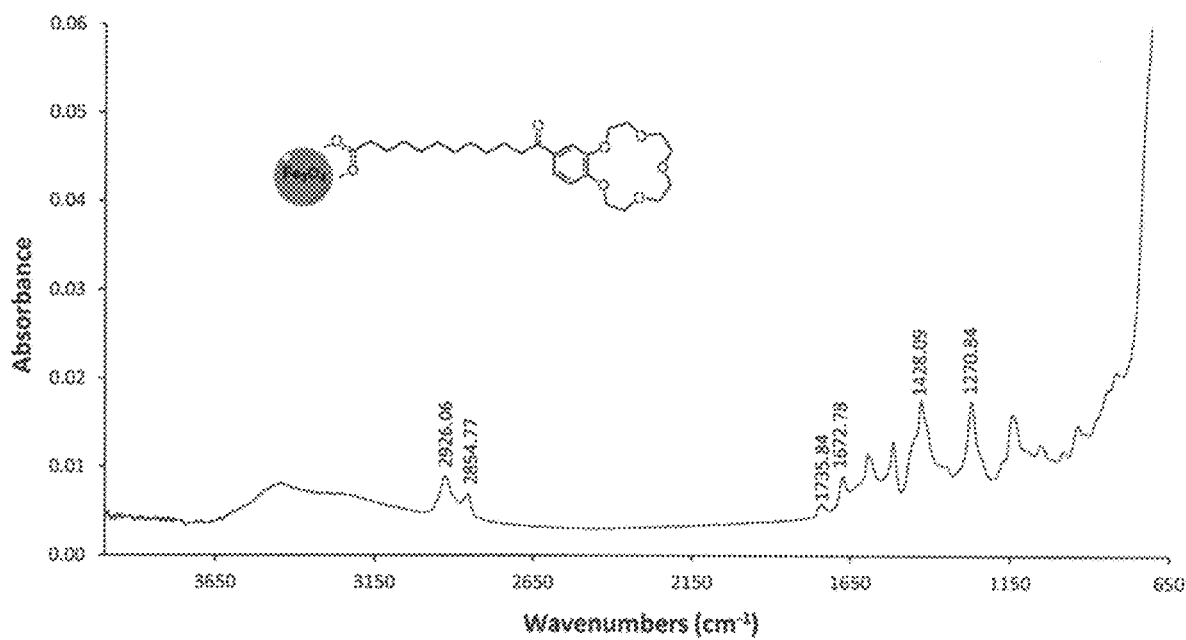
FIG. 9 is an FTIR spectrum with units of wavenumbers ($cm^{-1}$) (X-axis) vs. the absorbance (Y-axis) for magnetite nanoparticles functionalized with crown ether ligands via an in situ method described herein.

FIG. 8A-8B and FIG. 9 show Fourier-transform infrared spectroscopy (FTIR) results of bis-crown, crown acid, and in-situ functionalized magnetite, respectively. The infrared spectrometry was performed using an Attenuated Total Reflection Fourier Transform Infrared (ATR-FTIR) spectrometer with a single bounce diamond ATR crystal. The instrument used was a Nexus 870 FTIR spectrometer with a liquid $N_2$ cooled mercury cadmium telluride (MCTA) detector.

In FIG. 8A, the carbonyl peak in the spectrum of the bis-crown has been shifted to 1671 $cm^{-1}$, consistent with ketone formation. In contrast, in FIG. 8B, the crown acid spectrum exhibits two absorption peaks at 1730 $cm^{-1}$ and 1674 $cm^{-1}$, representing the carboxylic acid carbonyl and the ketone carbonyl, respectively. In FIG. 9, the in-situ functionalized magnetite nanoparticle spectrum exhibits a much less intense carbonyl stretching peak at 1735 $cm^{-1}$ and a higher intensity carbonyl stretch at 1672 $cm^{-1}$. These are the same peaks identified for the crown acid, but the lower intensity of the peak at 1735 $cm^{-1}$ indicates that most of the carboxylic acid functionalities are now present as carboxylate groups. The carboxylate stretch, typically between 1639-1646 $cm^{-1}$, is not seen due to the overlap of other peaks. The peak at 1735 $cm^{-1}$ suggests that some of the ligand exists as the carboxylic acid and may be bound to the nanoparticle by either hydrogen bonding or dipole forces between the hydrophobic segments of the ligands.

Figure 10A:
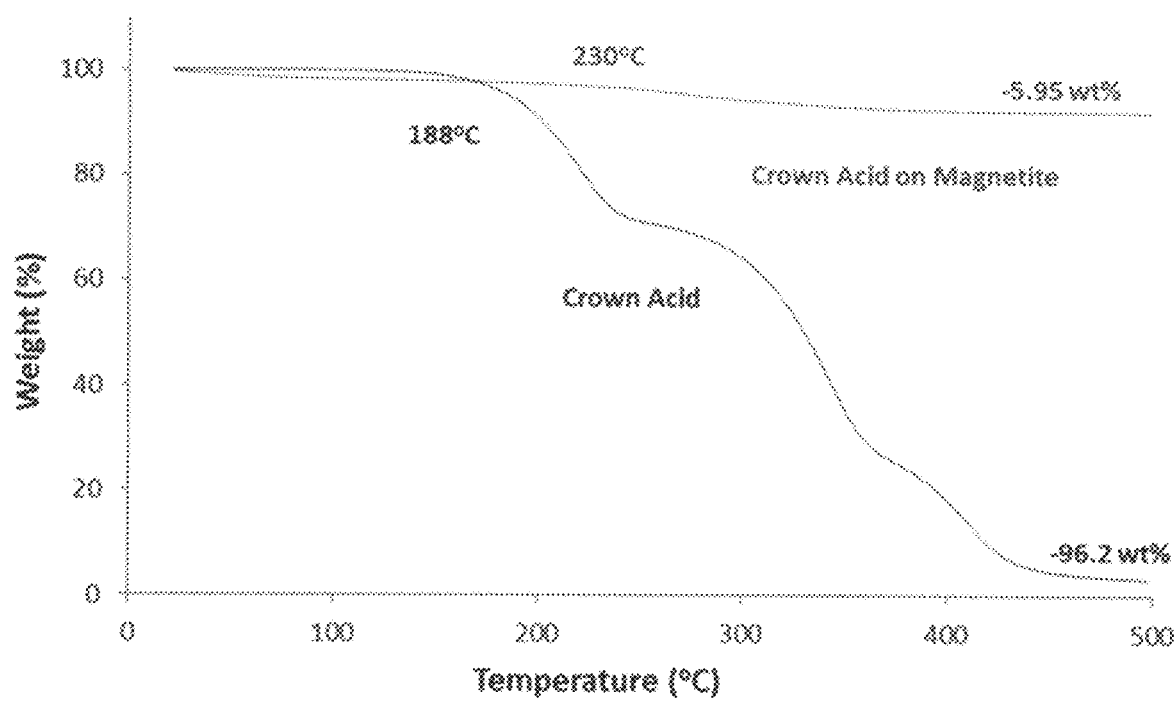
FIG. 10A-10B are thermogravimetric analysis results showing the temperature (° C.) (X-axis) vs. the weight (%) (Y-axis) for magnetite nanoparticles treated with crown acid and in-situ functionalized nanoparticles treated with crown acid.
Figure 10B:
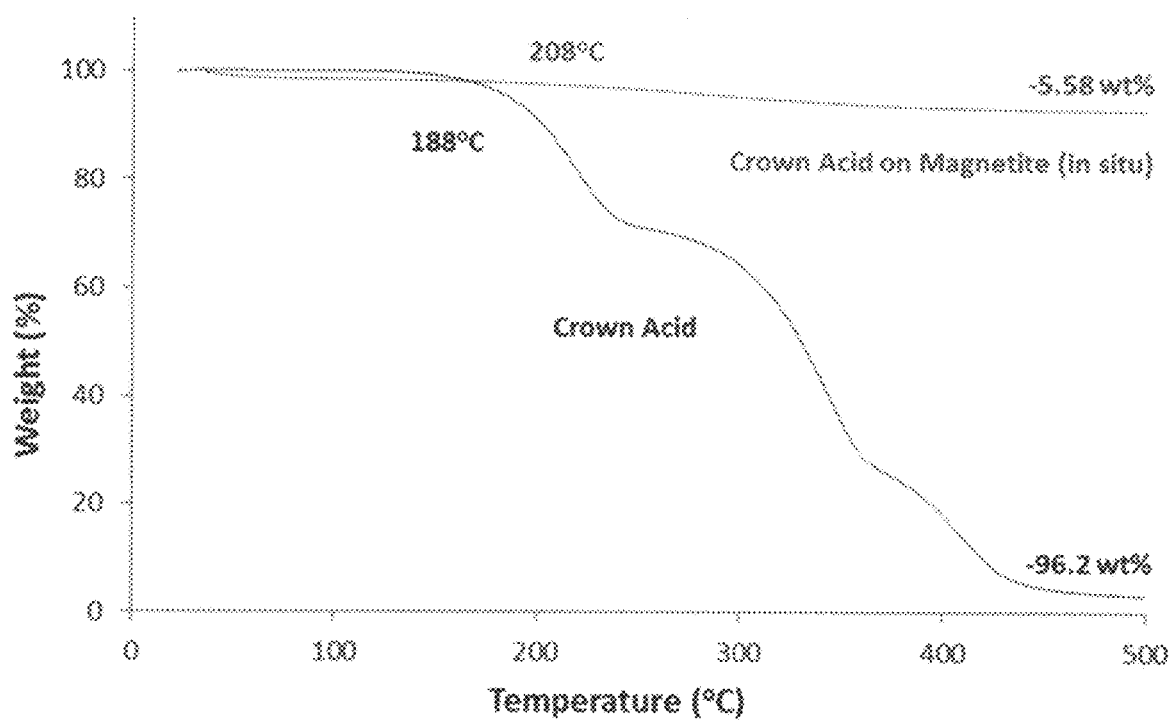

FIG. 10A-10B shows the thermograms from using thermogravimetric analysis (TGA) of post-functionalized crown acid magnetite nanoparticles and in-situ functionalized crown acid magnetite nanoparticles, respectively. TGA was performed to determine the degree of nanoparticle functionalization by the crown acid. TGA was performed on a TA Instruments Q5000IR TGA under a nitrogen flow of 50 ml/min using a temperature profile starting at 30° C. and increasing to 500° C. at 5° C./min.

In both FIGS. 10A and 10B, the crown acid loses 96.2% of its mass via three steps due to volatilization and thermal decomposition of the sample. The initial mass loss begins at 188° C. The TGA of the post-modified magnetite nanoparticles shows a mass loss of 5.95% with an onset temperature of 230° C. The higher temperature is attributed to the chemical bonding between the ligand and the nanoparticle surface. Similarly, the in situ treated magnetite nanoparticles lose 5.58% of their mass with an onset temperature of 208° C. The curve for the in situ treated magnetite nanoparticles is much flatter than the post-modified magnetite nanoparticles, suggesting that the ligands may be bound to a wider variety of surface sites compared to the ligands in the post-modified magnetite nanoparticles.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Unless otherwise stated, any feature described herein can be combined with any aspect or any other feature described herein.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 1 nm to about 100 nm should be interpreted to include not only the explicitly recited limits of from about 10 nm to about 65 nm, but also to include individual values, such as 3 nm, 37 nm, 50 nm, etc., and sub-ranges, such as from about 25 nm to about 55 nm, etc.

In describing and claiming the examples disclosed herein, the singular forms "a", "an", and "the" include plural referents unless the context clearly dictates otherwise.

What is claimed is:

1. A method for making crown ether functionalized substrates, comprising:
    modifying crown ether-based molecules, wherein carboxylic acid functionalized hydrocarbon chains are reacted with crown ether-based molecules, thereby forming modified crown ether-based molecules; and
    attaching the modified crown ether-based molecules to substrates, thereby forming crown ether functionalized substrates.

2. The method of claim 1, wherein the carboxylic acid functionalized hydrocarbon chain is selected from the group consisting of a diacid chain, a polyacid chain, an aromatic acid chain, and an aliphatic acid chain, and combinations thereof.

3. The method of claim 2, wherein the carboxylic acid functionalized hydrocarbon chain is added to the crown ether-based molecules in the presence of an acid catalyst selected from the group consisting of $P_2O_5$ in methanesulfonic acid, phosphoric acid, sulfuric acid, p-toluenesulfonic acid, heterogeneous Lewis acid catalysts, homogeneous Lewis acid catalysts, heterogeneous acid catalysts, heterogeneous Brønsted acids, homogenous Brønsted acids, and combinations thereof.

4. The method of claim 1, wherein the crown ether-based molecules are selected from the group consisting of substituted and non-substituted crown ethers containing an aromatic ring system, benzocrown ethers, azocrown ethers, metallacrown ethers, thiocrown ethers, cryptands, and combinations thereof.

5. The method of claim 1, wherein the carboxylic acid functionalized hydrocarbon chain includes two terminal carboxylic acid groups and about 4 carbon atoms to about 100 carbon atoms.

6. The method of claim 1, wherein the carboxylic acid functionalized hydrocarbon chain includes two carboxylic acid groups anywhere on the acid chain.

7. The method of claim 1, wherein the crown ether-based molecules and the carboxylic acid functionalized hydrocarbon chains are present in a ratio of about 1:1 to about 1:10, respectively.

8. The method of claim 1, wherein the substrate is solid or porous particles, a solid or porous support, a solid or porous surface, and combinations thereof.

9. The method of claim 8, wherein the particles have a diameter ranging from about 1 nm to about 500 microns.

10. The method of claim 9, wherein the particles are selected from the group consisting of magnetic particles, superparamagnetic particles, and combinations thereof.

11. The method of claim 10, wherein the particles are solid or porous nanoparticles selected from the group consisting of metallic particles, metal oxide particles, mixed metal oxide particles, and combinations thereof, wherein the particles have metals selected from the group consisting of Fe, Co, Ni, Mn, lanthanides, and combinations thereof.

12. The method of claim 8, wherein the solid support, porous support, solid surface, or porous surface is selected from the group consisting of metals, metal oxides, metalloid oxides, ceramics, polymers, and combinations thereof.

13. The method of claim 1, wherein attaching the crown ether-based molecules to a substrate includes heating, mixing, sonication, refluxing, altering the pH of a solution that contains both the substrates and the crown ether-based molecules, and combinations thereof.

* * * * *